United States Patent Office 3,118,707
Patented Jan. 21, 1964

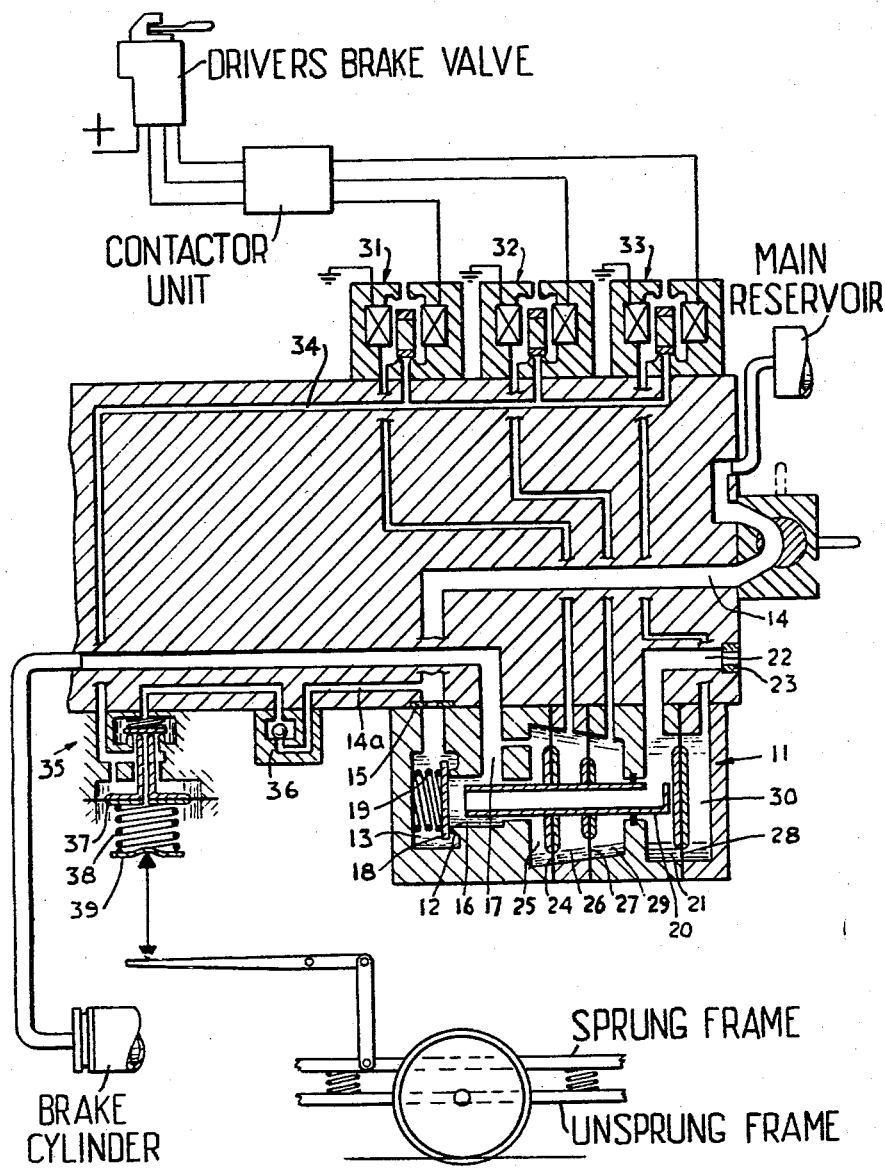

---

3,118,707
LOAD MODIFIED ELECTRIC DISTRIBUTION SYSTEM FOR BRAKES
Arthur William Simmons and Jack Washbourn, London, England, assignors to Westinghouse Brake and Signal Company, Limited, London, England
Filed May 5, 1961, Ser. No. 107,935
2 Claims. (Cl. 303—22)

The present invention relates to vehicle braking apparatus operable by fluid pressure and in its broader aspects concerns equally both compressed fluid and vacuum vehicle braking apparatus; except where the context dictates otherwise, references herein to "pressure" are therefore to be understood to refer to either sub-atmospheric or super-atmospheric pressure depending upon whether the apparatus concerned is operable by vacuum or compressed fluid.

Many kinds of such apparatus make use of electric remote control of the brakes in a train of vehicles with the advantage that the delays in operating the brakes are less than when the control is imposed by varying the pressure of fluid in a pipe extending continuously down the train. A well known example of this kind of apparatus is the electro-pneumatic (compressed air) brake which has two pipes extending down the train, one a main reservoir pipe and the other a brake pipe, and which further comprises electromagnetically operated application and holding valves controlling communication of a brake cylinder respectively with the main reservoir pipe and with atmosphere, and a triple valve responsive to reduction and restoration of the normal fully charged value of brake pipe pressure respectively to admit compressed air to and release it from the brake cylinder, such air being taken from an auxiliary reservoir which stores compressed air derived from the brake pipe. The electrically controlled portion serves as the main brake and the purely pneumatically controlled portion as a standby brake available as a safeguard against failure of the electric control.

In this known electro-pneupmatic brake the brake cylinder pressure is dependent on the local main reservoir pressure and timing chokes on each vehicle since the application and holding valves on all the vehicles in the train open and close at the same instants, giving uniform open periods. Consequently, if there should be any variation in choke sizes the degree of braking will also vary along the train.

A self-lapping valve acting to produce a brake cylinder pressure proportional to an applied force may be used on each vehicle to avoid this possibility of non-uniform braking in the train and the present invention has as its primary object the provision of a vehicle brake controlling device which besides employing a self-lapping valve is sensitive to variations of the vehicle load.

Variable load braking is to be distinguished from the simpler empty-load braking where only two braking ranges are involved, the one being operative below and the other above a changeover value of load. Disregarding the forms of variable load control which entail alteration of the leverage between the brake cylinder and the brake blocks, there are in general two well known categories applicable to compressed fluid brake apparatus. The first utilises a valve through which passes the compressed fluid for admission to the brake cylinder and which is conditioned by the vehicle load to prevent further admission once a maximum brake cylinder pressure related to a registered value of vehicle load has been reached. Such a valve therefore has a limiting function and merely alters the upper limit of brake cylinder pressure in accordance with load without affecting the degree of brake application obtained below this limit for any given position of a driver's brake valve for controlling the brakes in the train. The second category utilises a booster valve which relays compressed fluid to the brake cylinder to build up therein a pressure proportional to a force compounded of an unmodified brake cylinder control pressure and the same control pressure limited by a limiting valve similar to that already referred to under the first category. Such a booster valve therefore has the effect of reducing the brake cylinder pressure over a range of positions of the driver's brake valve which range extends from the position corresponding to maximum brake application further and further towards that corresponding to the minimum as the vehicle load lightens.

Although variable load braking in the second category improves to some extent on the lack of influence of load on partial brake applications which is characteristic of the first category, an extra and rather costly item, namely, the booster valve, is required. Furthermore, in both categories the limiting valve and the booster valve require passages large enough to pass all the fluid for admission to the brake cylinder.

According to the present invention a vehicle brake controlling device comprises a self-lapping valve arranged to produce in a brake cylinder a pressure differential proportional to an applied force, a pressure varying means to deliver a pressure differing from that of atmosphere to an extent dependent upon the vehicle load, pressure sensitive means to translate the pressure so delivered into the applied force, and means to vary the ratio of translation of the delivered pressure into the applied force, the last-mentioned means being controllable remotely otherwise than through the agency of the pressure in a pipe adapted to extend down a train of the vehicles. The action of the pressure varying means is to reduce a supply of vacuum or compressed fluid pressure, as the case may be, to values proportional to the vehicle load either as then prevailing or, in the event of the brake controlling device not being continuously sensitive to load, as registered on those occasions when the setting of the device in accordance with load takes place, for example, on initial charging of the brake apparatus or on stopping the vehicle. This pressure varying means is required to permit only as much flow as is necessary for giving the applied force at the self-lapping valve and can therefore be very much smaller than if it had to handle the flow for the brake cylinder. Furthermore it will be appreciated that all degrees of brake application are influenced by the load-varying pressure, and hence by the vehicle load, over the whole range of loading of the vehicle.

The variation of the ratio of translation may be arranged to be accomplished in steps using a form of remote control which is preferably electric. A fluid pressure operated actuator arranged to be capable of exerting a stepwise variable force conveniently constitutes the sub-combination of the pressure sensitive means and the remotely controllable means. For electric remote control, electromagnetically operated valves may be used to control selectively the admission of atmospheric pressure or the load-varying pressure delivered by the pressure varying means to the chambers between the differential pressure sensitive elements in the actuator.

An alternative aspect of the invention resides in the combination, in a vehicle brake controlling device, of a self-lapping valve arranged to produce in a brake cylinder a pressure differential proportional to an applied force, a force actuator to apply such force and having differential pressure sensitive elements defining chambers therebetween, a plurality of electromagnetically operated valves associated respectively with such chambers and operable selectively singly and in various combinations between a position venting the respectively associated chamber and a position admitting pressure fluid to the respectively associated chamber, and pressure varying means to vary in dependence upon the vehicle load the pressure of the fluid made available to at least one of the electromagnetically operated valves for admission to the respectively associated actuator chamber.

The invention will be further described by way of example with reference to its embodiment in a vehicle brake controlling device for railway compressed fluid braking apparatus, a portion of this device containing the features relevant to the invention being illustrated in diagrammatic section in the accompanying drawing. The braking apparatus concerned is to be understood to include separate main reservoir and brake pipes extending continuously down the train by inter-connection of the individual sections of such pipes carried by the vehicles making up the train. Both pipes are normally charged, the main reservoir pipe to a higher value of compressed fluid pressure than the brake pipe, and the latter serves only for a purely pneumatic standby brake.

Combined within a single sectionalised casing component 11 is a self-lapping valve and a compressed fluid operated force actuator, the former being located to the left as seen in the drawing and comprising a valve seat 12 disposed between, on the one hand, a chamber 13 in communication with a main reservoir passage 14 through an application choke 15 and, on the other hand, a chamber 16 in communication with a brake cylinder passage 17 leading to a brake cylinder, a disc valve closure member 18 lightly biassed by a compression spring 19 in the chamber 13 towards a closed position in seating engagement with the valve seat 12, a hollow tubular stem 20 opening at one end into an atmospheric chamber 21 in communication with the atmosphere through a passage 22 and an exhaust choke 23 and formed at the other end as a valve seat disposed co-axially with the valve seat 12 and engageable with the underside of the disc valve closure member 18, and a diaphragm 24 attached to the stem 20 and separating two chambers, namely a chamber 25 adjacent and in communication with the brake cylinder chamber 16 and a chamber 26 constituting one of the chambers of the force actuator.

The force actuator is completed by two further diaphragms 27 and 28 clamped around their outer margins, as is the diaphragm 24 also, between sections of the casing component 11. The diaphragm 27 is attached to the stem 20 and separates from the chamber 26 a chamber 29. The diaphragm 28 bears against the exhaust end of the stem 20 and separates from the atmospheric chamber 21 a chamber 30.

Three electromagnetically operated valves designated generally 31, 32 and 33 are associated respectively with the chambers 26, 29 and 30 of the force actuator and, when de-energised as shown, these valves assume a venting position in which the respectively associated chambers are vented to atmosphere. When energised, the electromagnetically operated valves are operated to an admission position establishing communication of the respectively associated chambers with a common feed pipe 34 having a branch to each of the valves 31, 32 and 33.

The feed pipe 34 makes available continuously at the electromagnetically operated valves a supply of compressed fluid which is derived from the main reservoir pipe and is at a pressure controlled by a variable load reducing valve device designated generally 35. Main reservoir pressure is conducted to this device through a branch 14a of the main reservoir passage 14 and a check valve 36 directed to prevent flow towards the main reservoir passage, this check valve being provided because the delivery of the reducing valve device 35 is utilised elsewhere in the brake controlling device and is arranged to be sustained by an alternative supply in the event of failure of the main reservoir pressure.

Basically the construction of the reducing valve device 35 is of a form well known for reducing valves: communication of the feed passage 34 with atmosphere on the one hand, and with the main reservoir branch passage 14a, on the other hand, is controlled by the movements of a diaphragm 37 subject on its upper side to the pressure of compressed fluid delivered to the feed passage and on its underside to the opposing force of a coiled compression spring 38 disposed in an atmospheric chamber. It will be appreciated that the pressure of compressed fluid delivered to the feed passage will be proportional to the force exerted by the spring 38 and that this pressure can be varied by adjustment of the degree of compression of the spring.

In the drawing, oppositely directed arrowheads indicate that a spring seat 39 bearing the lower end of the spring 38 is movable to vary the spring's compression, and this movement is effected in accordance with the vehicle load in the manner outlined briefly as follows: on each occasion when the doors of the vehicle are opened and closed (the assumption being that the vehicle is passenger stock) a measuring operation is performed automatically between selected sprung and unsprung portions of the vehicle, the separation between such portions being a measure of the prevailing load, and the measurement so obtained is translated automatically in inverse proportion into compression of the spring 38, the setting then being locked until the next door operation occurs. Consequently the pressure of compressed fluid delivered to the feed passage 34 increases with increasing vehicle load. Even at maximum vehicle load the feed passage pressure is reduced appreciably relative to normal main reservoir pressure to ensure that this feed passage pressure is not influenced by diminution of main reservoir pressure down the train.

When the electromagnetically operated valves 31, 32 and 33 are de-energized as shown, the chambers 26, 29 and 30 of the force actuator in the casing component 11 are all vented so that no force is exerted on the stem 20 of the self-lapping valve and consequently the brake cylinder is vented also and the brakes released.

The electromagnetically operated valves are energisable over separate respective train wires by movement of a driver's brake valve, situated remotely in the locomotive, into an application zone. There are seven positions in this zone corresponding respectively to the seven available possibilities of energising the valves differently, either singly or in combination. The differential diaphragms 24, 27 and 28 have effective areas which are so interrelated in conjunction with the disposition of the intervening chambers that, for a given pressure of compressed fluid made available at the electromagnetically operated valves, the energisation of each valve singly will cause the actuator to apply a different force to the self-lapping valve. The steps of energisation are arranged to take place in such a pattern that movement of the driver's brake valve from the release position through the application zone results consistently in substantially uniform increments of the applied force.

Whilst selection of the degree of brake application by the driver is effected by varying in steps the area of the actuator effectively exposed to compressed fluid pressure, load control of the brake application is superimposed steplessly by variation of this pressure. As the vehicle load increases or decreases so this pressure is increased or decreased by the reducing valve device 35.

The action of a self-lapping valve as shown to produce in the brake cylinder a pressure proportional to the applied force is generally well known and is briefly that the force prevails in the direction towards the left (as seen in the drawing) to cause unseating of the disc valve closure member 18 for admission to the brake cylinder until the pressure built up in the brake cylinder acting on the diaphragm 24 in the chamber 25 becomes sufficient to balance the applied force, whereupon the valve laps, that is to say, assumes the position in which the closure member is seated both on the seat 12 and the adjacent open end of the stem 20 in order to hold the brake applied. It will be appreciated that the brakes are graduated since the brake cylinder pressure is self-adjusting up or down in accordance with the degree of pressure applied to the self-lapping valve.

Having thus described our invention what we claim is:

1. A variable load brake controlling equipment for vehicles comprising, in combination, a brake cylinder, a force actuator including a self-lapping valve actuable thereby, magnet valve means for supplying fluid pressure to said force actuator, remote control means for selective energization of said magnet valve means to produce a brake cylinder pressure in accordance with different combinations of energization of said magnet valve means, and a variable load valve for providing a pressure in proportion to the vehicle load, said magnet valve means being supplied with fluid pressure delivered by said variable load valve such that the resultant brake cylinder pressure delivered via said self-lapping valve is dependent proportionately on the degree of regulation of the remote control means and on the load of the vehicle.

2. A variable load brake controlling equipment for vehicles as recited in claim 1, in which said force actuator comprises a plurality of differential pressure sensitive elements defining chambers therebetween for the reception of pressure from said valve means.

References Cited in the file of this patent

UNITED STATES PATENTS

| 2,187,942 | Logan | Jan. 23, 1940 |
| 2,194,762 | Maliphant | Mar. 26, 1940 |
| 2,344,868 | Hewitt | Mar. 21, 1944 |